US012571515B2

(12) United States Patent
Goto et al.

(10) Patent No.: US 12,571,515 B2
(45) Date of Patent: Mar. 10, 2026

(54) VEHICLE LAMP

(71) Applicant: STANLEY ELECTRIC CO., LTD., Tokyo (JP)

(72) Inventors: Yuta Goto, Tokyo (JP); Toshiharu Ajisaka, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 19/025,293

(22) Filed: Jan. 16, 2025

(65) Prior Publication Data

US 2025/0237368 A1 Jul. 24, 2025

(30) Foreign Application Priority Data

Jan. 18, 2024 (JP) ................................ 2024-005784

(51) Int. Cl.
*F21S 45/33* (2018.01)

(52) U.S. Cl.
CPC .................................... *F21S 45/33* (2018.01)

(58) Field of Classification Search
CPC .. F21S 45/33; F21S 45/37; F21S 45/43; F24F 7/00; F24F 2007/001; F24F 13/08
USPC ........................................ 362/547, 294, 373
See application file for complete search history.

(56) References Cited

U.S. PATENT DOCUMENTS

| | | | | |
|---|---|---|---|---|
| 4,724,515 A * | 2/1988 | Matsuki | B60Q 1/302 362/547 |
| 8,746,937 B2 * | 6/2014 | Hong | F21S 45/33 362/373 |
| 10,753,571 B2 * | 8/2020 | Schubert | F21S 45/37 |
| 2014/0354155 A1 * | 12/2014 | Clifford | F21K 9/23 362/373 |
| 2016/0084471 A1 * | 3/2016 | Sander | F21S 45/33 362/547 |

FOREIGN PATENT DOCUMENTS

JP 2007-335292 A 12/2007

* cited by examiner

*Primary Examiner* — Thomas M Sember
(74) *Attorney, Agent, or Firm* — Kenealy Vaidya LLP

(57) ABSTRACT

A vehicle lamp has a lighting unit disposed inside a lighting body constituted by a housing having an opening in a front surface of the housing and an outer lens configured to cover the opening of the housing, a plurality of ventilation ports are provided in the housing, and at least one of the plurality of ventilation ports has a diameter that changes between a front surface side and a back surface side of the housing.

10 Claims, 6 Drawing Sheets

VEHICLE LAMP

CROSS-REFERENCE TO RELATED APPLICATION

Priority is claimed to Japanese Patent Application No. 2024-005784, filed Jan. 18, 2024, the content of which is incorporated herein by reference.

BACKGROUND OF THE INVENTION

Field of the Invention

The present invention relates to a vehicle lamp.

Description of Related Art

In the related art, there is a vehicle lamp in which a lighting unit configured to radiate light forward is disposed inside a lighting body constituted by a housing with a front surface that is open, and an outer lens (cover lens) configured to cover the opening of the housing.

Such a vehicle lamp has a structure in which members such as a light source lamp (light source), an inner lens (light guide body), a reflector, an extension, a bracket, and the like, that constitute a lighting unit, are disposed inside a lighting body, and these members are attached to an inner side of the lighting body.

Incidentally, in the vehicle lamp, for example, the air inside the lighting body expands and contracts due to temperature changes caused by turning the lighting unit on and off, or temperature changes caused by the external environment in which the lighting unit is installed, such as solar light irradiation or engine heat, so ventilation (intake/exhaust) is provided through a ventilation port (breathing hole) provided in the lighting body (for example, see Japanese Unexamined Patent Application, First Publication No. 2007-335292).

Meanwhile, in the vehicle lamp, when the outside temperature is lower than the temperature in the lighting body, humidity (moisture) in the lighting body may be condensed on an inner surface of the outer lens to generate cloudiness on the inner surface of the outer lens. When condensation (cloudiness) is generated on an inner surface of the outer lens, not only does it result in a poor appearance, but it also reduces the transmittance of the light emitted forward from the lighting unit, resulting in deterioration in lamp function (in particular, illuminance).

Japanese Unexamined Patent Application, First Publication No. 2007-335292 discloses a cloudiness prevention structure of a vehicle lamp configured to prevent cloudiness on a lens surface of a lighting tool by passing air through the lighting tool, in which an introduction route connected to a draft passage to discharge air in a vehicle compartment to the outside of a vehicle body and a discharge route branched off from the introduction route and configured to directly discharge the air in the vehicle compartment to the outside of the vehicle body are disposed in the lighting tool, a tip of the introduction route opens in a lamp chamber in which a bulb is provided, and the discharge route has a middle portion communicating with the inside of the lamp chamber and a tip that opens outside the vehicle body.

According to the invention disclosed in Japanese Unexamined Patent Application, First Publication No. 2007-335292, the air in the vehicle compartment is led through the draft passage to the introduction route, and a part of the air is discharged to the outside of the vehicle body through the discharge route, but most of the air flows into the lamp chamber from the tip of the introduction route. Then, the air that flows into the lamp chamber flows into the discharge route via a connecting portion between the discharge route and the lamp chamber, and is then discharged from the discharge route to the outside of the vehicle body. Accordingly, sufficient air becomes flowing through the lamp chamber, making it possible to prevent cloudiness on the inner surface of the lens.

SUMMARY OF THE INVENTION

However, in the invention disclosed in Japanese Unexamined Patent Application, First Publication No. 2007-335292, an introduction route configured to introduce the air from the vehicle compartment into the lamp chamber is required to provide a duct that forms an introduction route, and a discharge route to discharge the air from the lamp chamber to the outside of the vehicle body. The duct is a separate part from the vehicle lamp, and its structure becomes more complex. In addition, the increase in the number of parts also leads to increased costs.

An aspect of the present invention is directed to providing a vehicle lamp capable of ventilating the inside of a lighting body through a simple configuration, and further, controlling a flow air in the lighting body.

An aspect of the present invention provides the following configurations.

(1) A vehicle lamp according to an aspect of the present invention is a vehicle lamp having a lighting unit disposed inside a lighting body constituted by a housing having an opening in a front surface of the housing and an outer lens configured to cover the opening of the housing, wherein a plurality of ventilation ports are provided in the housing, and at least one of the plurality of ventilation ports has a diameter that changes between a front surface side and a back surface side of the housing.

(2) In the vehicle lamp of the aspect of the above-mentioned (1), the plurality of ventilation ports have a first ventilation port with a diameter on the back surface side smaller than a diameter on the front surface side of the housing, and a second ventilation port with a diameter on the back surface side larger than a diameter on the front surface side of the housing.

(3) In the vehicle lamp of the aspect of the above-mentioned (2), the first ventilation port and the second ventilation port have a tubular duct portion on at least one side of the back surface side and the front surface side of the housing, and the duct portion has a hole shape having a diameter that changes continuously or stepwise between an opening end on the front surface side and an opening end of the back surface side.

According to the aspect of the present invention, it is possible to provide a vehicle lamp capable of ventilating the inside of a lighting body through a simple configuration, and further, controlling a flow air in the lighting body.

DETAILED DESCRIPTION OF THE INVENTION

Figure 1:
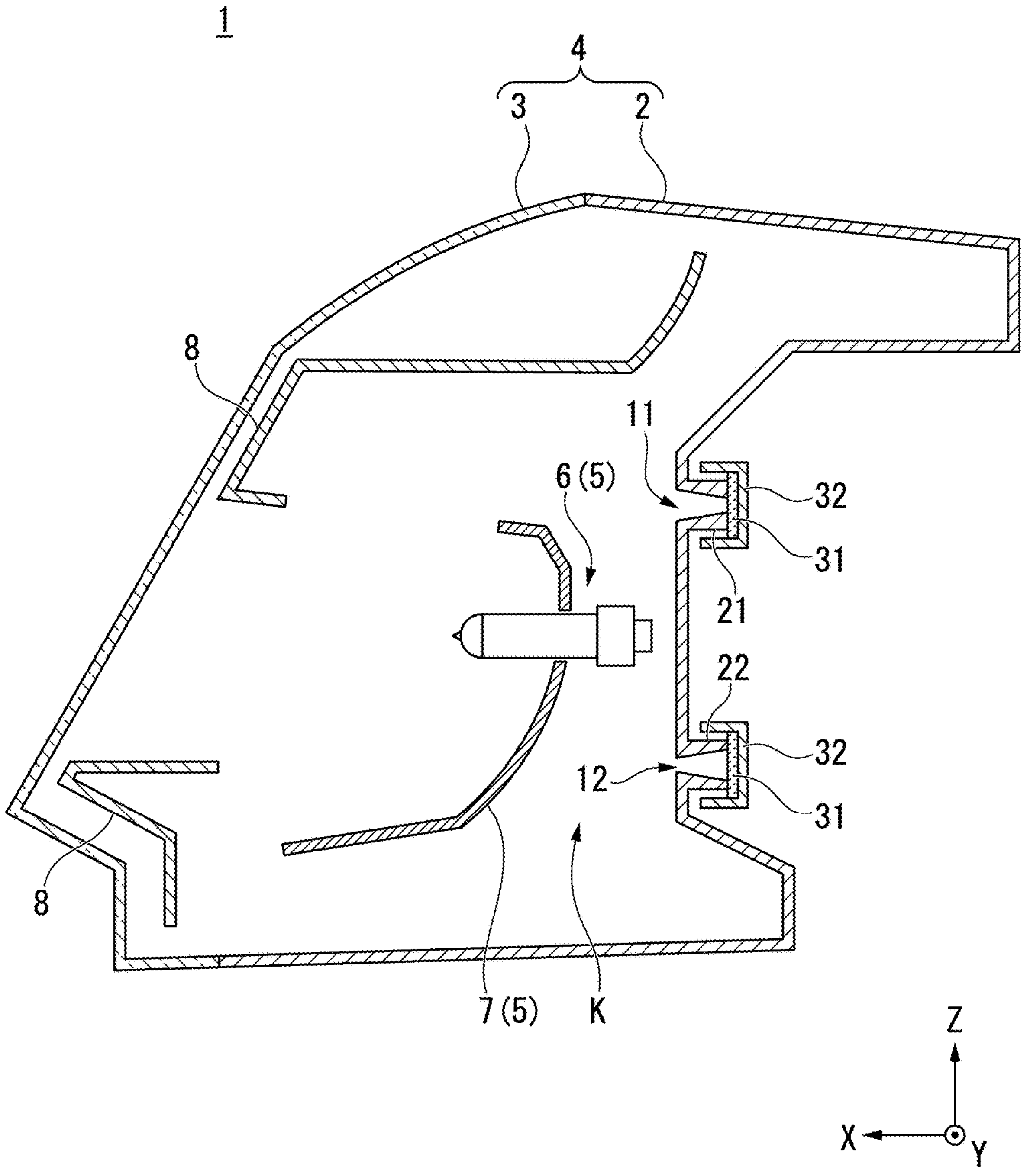
FIG. 1 is a cross-sectional view showing a configuration of a vehicle lamp according to an embodiment of the present invention.

Hereinafter, an embodiment of the present invention will be described with reference to the accompanying drawings in detail.

Further, in the drawings used in the following description, in order to make each component easier to see, dimensions of each component may be shown at different scales, and dimensional ratios of each component may not necessarily be the same as in reality.

As the embodiment of the present invention, for example, a vehicle lamp 1 shown in FIG. 1 to FIG. 5 will be described.

Figure 2:
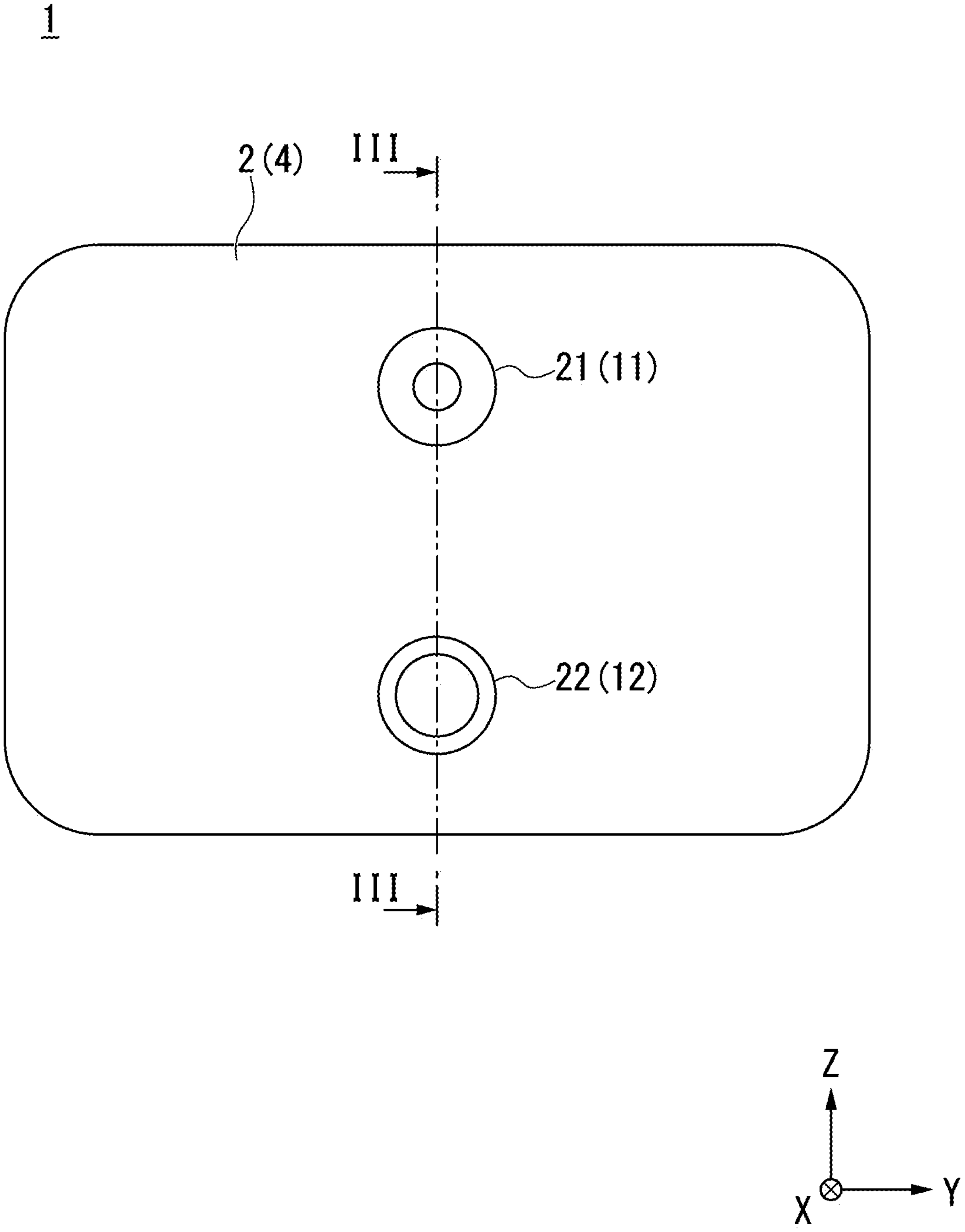
FIG. 2 is a rear view of a lighting body that constitutes the vehicle lamp shown in FIG. 1.
Figure 3:
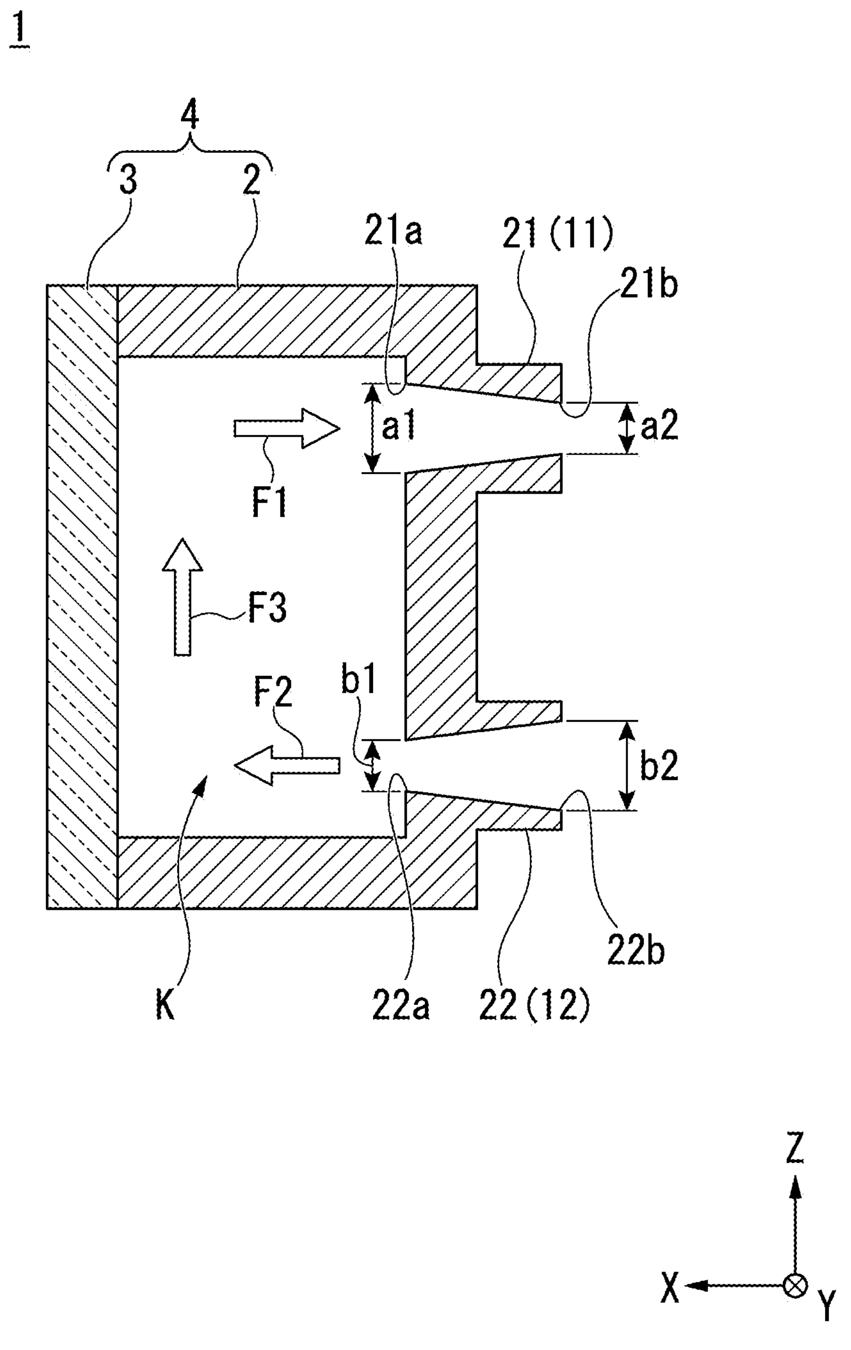
FIG. 3 is a cross-sectional view of a lighting body along line segment III-III shown in FIG. 2.
Figure 4:
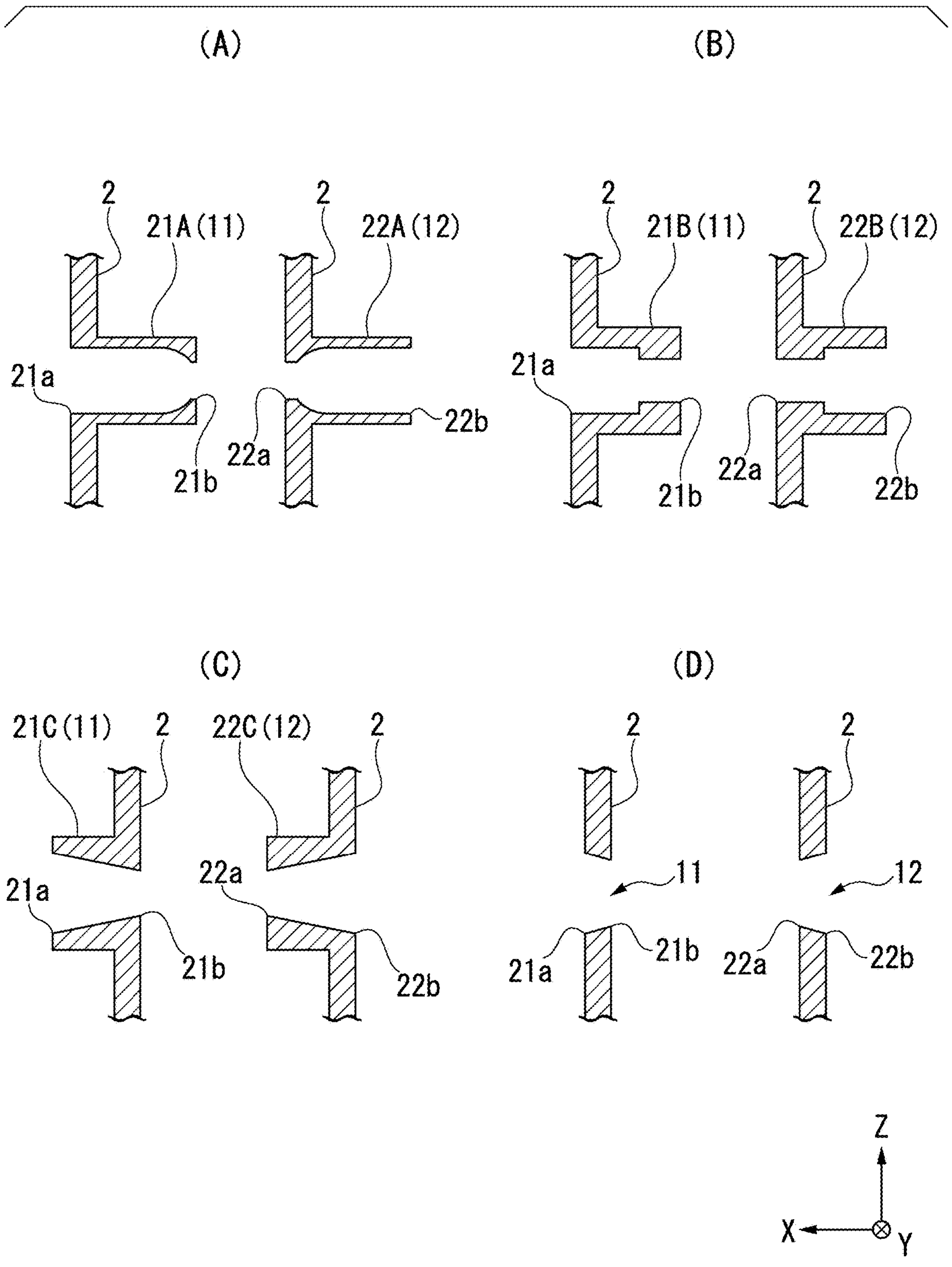
FIG. 4 is a cross-sectional view showing a variant of a first ventilation port and a second ventilation port.
Figure 5:
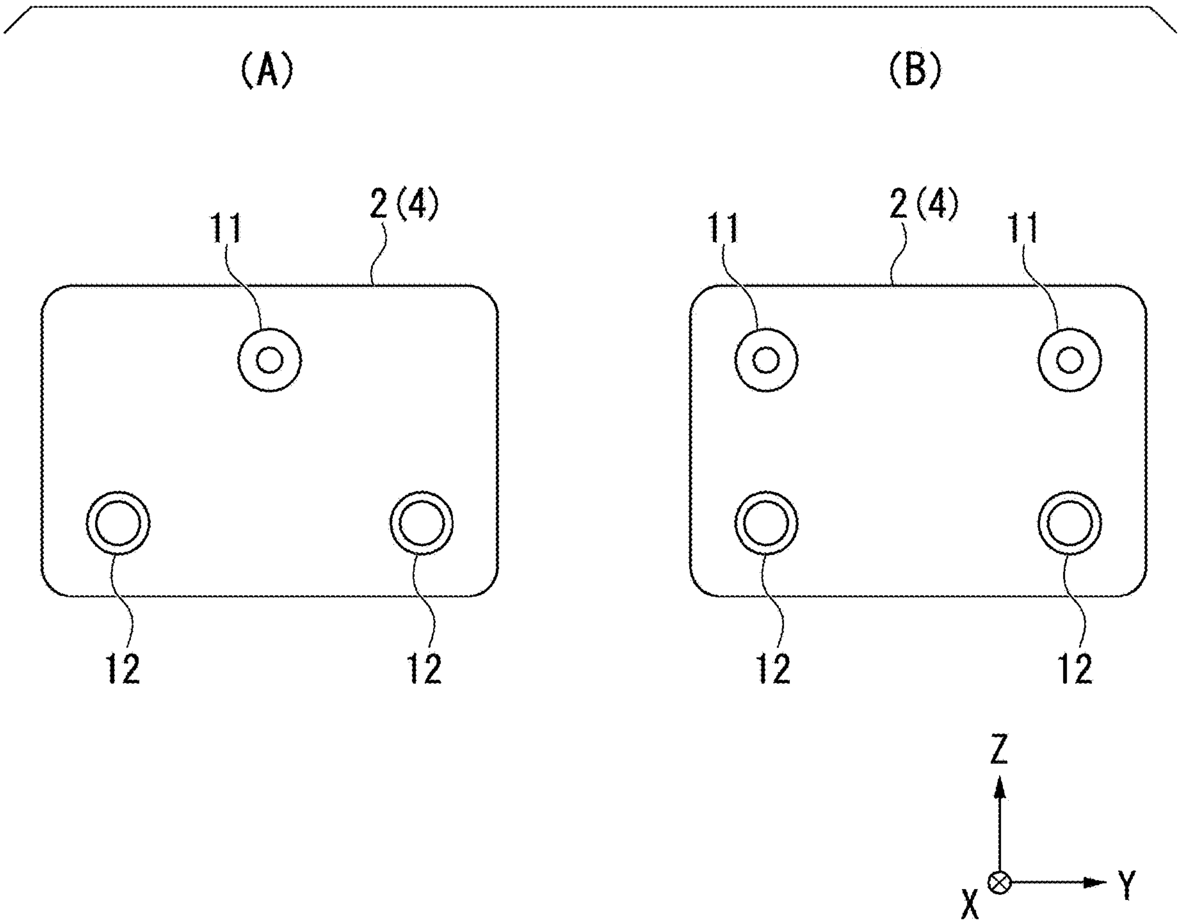
FIG. 5 is a rear view of the lighting body in which disposition of the first ventilation port and the second ventilation port is changed.

Further, FIG. 1 is a cross-sectional view showing a configuration of the vehicle lamp 1. FIG. 2 is a rear view of a lighting body 4 that constitutes the vehicle lamp 1. FIG. 3 is a cross-sectional view of the lighting body 4 along line segment III-III shown in FIG. 2. FIG. 4 is a cross-sectional view showing a variant of a first ventilation port 11 and a second ventilation port 12. FIG. 5 is a rear view of the lighting body 4 in which disposition of the first ventilation port 11 and the second ventilation port 12 is changed.

In addition, in the drawings as described below, an XYZ orthogonal coordinate system is set, an X-axis direction indicates a forward/rearward direction (lengthwise direction) of the vehicle lamp 1, a Y-axis direction indicates a leftward/rightward direction (widthwise direction) of the vehicle lamp 1, and a Z-axis direction indicates an upward/downward direction (height direction) of the vehicle lamp 1.

The vehicle lamp 1 of the embodiment is, for example, an application of the present invention to vehicle headlights (head lamps) mounted on both corner portions on a front end side of a vehicle (not shown).

Specifically, as shown in FIG. 1, the vehicle lamp 1 has a structure in which a lighting unit 5 is disposed in a space K inside the lighting body 4 constituted by a housing 2 with a front surface that is open, and a transparent outer lens 3 configured to cover the opening of the housing 2.

The lighting unit 5 includes, for example, a light source 6 configured to emit white light (hereinafter, simply referred to as light), and a reflector 7 configured to reflect the light emitted from the light source 6, and the light reflected by the reflector 7 is radiated toward a side in front of the vehicle.

In addition, an extension 8 configured to cover surroundings of a front surface side of the reflector 7 (the lighting unit 5) is disposed inside the lighting body 4. Further, a bracket (not shown) or the like configured to attach the above-mentioned members to an inner side of the lighting body 4 is disposed inside the lighting body 4. Further, the shape of the lighting body 4 can be changed as appropriate to match the design of the vehicle lamp 1.

The lighting unit 5 is not necessarily limited to a configuration in which the light reflected by the reflector 7 described above is directed to be emitted toward the side in front of the vehicle, but may be configured, for example, to direct the light emitted from the light source 6 toward the side in front of the vehicle using a light guide body (not shown) such as an inner lens or the like.

For the light source 6, a light source lamp such as a halogen lamp, an HID lamp, or the like, can be used. In addition, in addition to the above-mentioned light source lamp, light emitting elements such as light emitting diodes (LEDs), laser diodes (LDs), or the like, can also be used. Further, the number of the light emitting elements is not limited to one and may be plural.

Incidentally, in the vehicle lamp 1 of the embodiment, as shown in FIG. 2 and FIG. 3, since the air inside the lighting body 4 expands and contracts due to temperature changes caused by turning on and off the lighting unit 5, ventilation (intake/exhaust) is performed through a plurality of (in the embodiment, two) ventilation ports 11 and 12 provided on the back surface side of the housing 2 (the lighting body 4).

In the vehicle lamp 1 of the embodiment, at least one of the plurality of ventilation ports 11 and 12 has a different diameter between the front surface side and the back surface side of the housing 2.

Specifically, the vehicle lamp 1 of the embodiment has the first ventilation port 11 in which a diameter a2 on the back surface side is smaller than a diameter a1 on the front surface side of the housing 2 (a1>a2), and the second ventilation port 12 in which a diameter b2 on the back surface side is greater than a diameter b1 on the front surface side of the housing 2 (b1<b2).

In addition, the first ventilation port 11 is disposed on an upper side of the housing 2, and the second ventilation port 12 is disposed on a lower side of the housing 2. That is, the first ventilation port 11 is located above the second ventilation port 12.

The first ventilation port 11 and the second ventilation port 12 have ducts 21 and 22 protruding in tubular shapes from at least one of the back surface side and the front surface side of the housing 2. In the embodiment, the first ventilation port 11 has a first duct 21 protruding in a tubular shape from the back surface side of the housing 2. The second ventilation port 12 has a second duct 22 protruding in a tubular shape from the back surface side of the housing 2. The first and second ventilation ports 11 and 12 are constituted by ventilation holes (breathing holes) passing through the first and second ducts 21 and 22.

The first duct 21 has a tapered straight hole shape having a diameter linearly (continuously) reduced from an opening end 21*a* on the front surface side toward an opening end 21*b* on the back surface side. The second duct 22 has a tapered straight hole shape having a diameter linearly (continuously) increased from an opening end 22*a* on the front surface side toward an opening end 22*b* on the back surface side.

A filter 31 and a cap 32 configured to cover the first ventilation port 11 and the second ventilation port 12 are provided on the back surface sides of the first duct 21 and the second duct 22.

The filter 31 is made of a breathable disk-shaped member such as nonwoven fabric, paper, or sponge. The filter 31 is disposed while being sandwiched between the opening ends 21*b* and 22*b* and the cap 32 on the back surface sides of the first and second ducts 21 and 22.

The cap 32 is fitted to the first and second ducts 21 and 22 so as to cover the back surface sides of the first and second ducts 21 and 22. A gap in communication with the first and second ventilation ports 11 and 12 is provided inside the cap 32.

In the vehicle lamp 1 of the embodiment having the above-mentioned configuration, ventilation within the lighting body 4 is performed through the first ventilation port 11 and the second ventilation port 12, preventing condensation (cloudiness) from occurring on the inner surface of an outer lens 3.

Specifically, in the vehicle lamp 1 of the embodiment, due to the pressure difference (dynamic pressure or static pressure) occurring inside and outside the lighting body 4, an air current F1 is generated on the side of the first ventilation port 11, flowing from the opening end 21*a* on the front surface side of the first duct 21 to the opening end 21*b* on the back surface side, and exhaust is performed inside the lighting body 4.

Meanwhile, on the side of the second ventilation port 12, an air current F2 is generated that flows from the opening end 22*b* on the back surface side of the second duct 22 toward the opening end 22*a* on the front surface side, and is taken into the lighting body 4. In addition, within the lighting body 4, an air current F3 is generated, flowing from the second ventilation port 12 of the lower side to the first ventilation port 11 of the upper side.

Accordingly, in the vehicle lamp 1 of the embodiment, the circulation (convention) of the air inside the lighting body 4 is performed by controlling the flow directions of the air currents F1, F2 and F3, which are generated by the pressure difference between the inside and outside of the lighting body 4. In addition, by performing the circulation (convention) of the air along the inner surface of the outer lens 3, it is possible to prevent cloudiness from occurring on the inner surface of the outer lens 3.

In addition, the pressure difference inside and outside the lighting body 4 is generated not only by the expansion/contraction of the air inside the lighting body 4 due to the temperature change inside the lighting body 4 described above, but also by the air current (traveling wind, or the like) flowing outside the lighting body 4 when the vehicle is traveling.

Accordingly, in the vehicle lamp 1 of the embodiment, not only the temperature change within the lighting body 4, but also the pressure difference between the inside and outside of the lighting body 4 that occurs when a vehicle is traveling causes the air circulation (convention) within the lighting body 4 described above, making it possible to prevent cloudiness from occurring on the inner surface of the outer lens 3.

Further, in the vehicle lamp 1 of the embodiment, when the air in the lighting body 4 expands, since the circulation (convention) of the air within the lighting body 4 is promoted, it is possible to enhance a cloudiness prevention effect on the inner surface of the outer lens 3.

In addition, in the vehicle lamp 1 of the embodiment, the air heated inside the lighting body 4 described above rises to become the air current F3, which generates a strong air current F3 from the second ventilation port 12 of the lower side to the first ventilation port 11 of the upper side, and a flow velocity of this air current F3 increases. Accordingly, it is possible to enhance the heat dissipation effect within the lighting body 4, and to efficiently lower the temperature within the lighting body 4.

Further, the present invention is not necessarily limited to the above-mentioned embodiment, and various modifications can be made without departing from the scope of the present invention.

Specifically, the first and second ventilation ports 11 and 12 are not limited to the configuration of the first and second ducts 21 and 22 described above, but may be configured as shown, for example, in portions (A) to (D) of FIG. 4.

Among these, the first and second ventilation ports 11 and 12 shown in a portion (A) of FIG. 4 are configured with curved tapered first and second ducts 21A and 22A, in which the diameter is curved (continuously) different between the opening ends 21*a* and 22*a* on the front surface side and the opening ends 21*b* and 22*b* on the back surface side.

Meanwhile, the first and second ventilation ports 11 and 12 shown in a portion (B) of FIG. 4 have first and second ducts 21B and 22B with gradually differing diameters between the opening ends 21*a* and 22*a* on the front surface side and the opening ends 21*b* and 22*b* on the back surface side.

Meanwhile, the first and second ventilation ports 11 and 12 shown in a portion (C) of FIG. 4 have first and second ducts 21C and 22C protruding in a cylindrical shape from the front surface side of the housing 2.

Meanwhile, the first and second ventilation ports 11 and 12 shown in a portion (D) of FIG. 4 have a configuration in which the first and second ducts 21 and 22 are omitted and the opening ends 21*a* and 22*a* on the front surface side of the housing 2 have different diameters from the opening ends 21*b* and 22*b* on the back surface side of the housing 2.

In addition, the first and second ventilation ports 11 and 12 can be optimized by appropriately changing their disposition and number to match the space K within the lighting body 4, as shown, for example, in a portion (A) of FIG. 5 and the a portion (B) of FIG. 5.

Among these, the lighting body 4 shown in the portion (A) of FIG. 5 has one first ventilation port 11 on the upper side and two second ventilation ports on the lower side. Meanwhile, the lighting body 4 shown in the portion (B) of FIG. 5 has two first ventilation ports 11 on the upper side and two second ventilation ports on the lower side.

Further, the present invention may be configured to include a ventilation port having the same diameter between the front surface side and the back surface side of the housing 2, as long as at least one of the plurality of ventilation ports has a different diameter between the front surface side and the back surface side of the housing 2.

In addition, the diameter a1 on the front surface side and the diameter a2 on the back surface side of the first ventilation port 11, the diameter b1 on the front surface side and the diameter b2 on the back surface side of the second ventilation port 12, or the lengths of the first and second ducts 21 and 22 are not particularly limited but may be changed as appropriate.

Meanwhile, when the diameter a2 on the back surface side of the first ventilation port 11 and the diameter b2 on the back surface side of the second ventilation port 12 are aligned (a2=b2), it is possible to keep the inflow of air into the lighting body 4 low and promote the outflow of the air from the lighting body 4.

In addition, the first and second ventilation ports 11 and 12 are not limited to being disposed in the upward/downward direction as described above, but may also be disposed in the leftward/rightward direction, with the first ventilation port 11 acting as an exhaust port and the second ventilation port 12 acting as an intake port, making it possible to provide ventilation within the lighting body 4 through the first ventilation port 11 and the second ventilation port 12.

Further, in the embodiment, while the case in which the present invention is applied to the vehicle headlight (head lamp) has been exemplified, the vehicle lamp to which the present invention is applied is not limited to the above-mentioned front-side vehicle lamp, but for example, the present invention may be applied to a rear-side vehicle lamp such as a rear combination lamp or the like.

EXAMPLE

Hereinafter, the effects of the present invention will become clearer through examples. Further, the present invention is not limited to the following examples, but may be changed and executed as appropriate without departing from the scope of the present invention.

First Example

Figure 6:
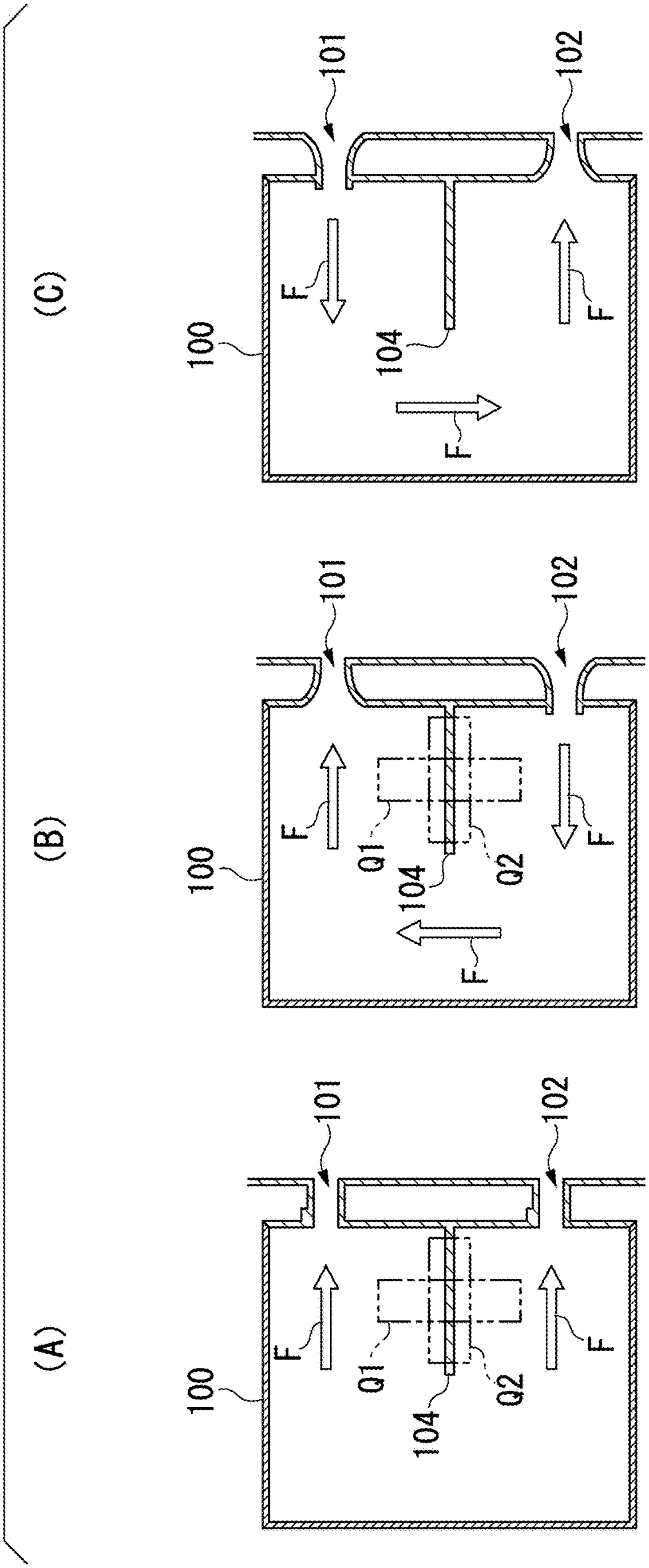
FIG. 6 is a cross-sectional view showing a box that imitates a lighting body in an example.

In a first example, as shown in portions (A) to (C) of FIG. 6, two ventilation ports 101 and 102 were provided on upper and lower sides of a back surface of a box 100 modeled after a lighting body, and a flow of air current F generated within the box 100 due to differences in hole shapes of the ventilation ports 101 and 102 was obtained by simulation.

Among these, the box 100 shown in the portion (A) of FIG. 6 is a case in which the diameter of the upper ventilation port 101 is constant and the diameter of the lower ventilation port 102 is constant.

Meanwhile, the box 100 shown in the portion (B) of FIG. 6 is a case in which the diameter of the upper ventilation port 101 is reduced toward the back surface side and the diameter of the lower ventilation port 102 is increased toward the back surface side.

Meanwhile, the box 100 shown in the portion (C) of FIG. 6 is a case in which the diameter of the upper ventilation port 101 is increased toward the back surface side and the diameter of the lower ventilation port 102 is reduced toward the back surface side.

In addition, a partition wall 104 configured to partition the upper ventilation port 101 and the lower ventilation port 102 is provided inside the box 100.

For the boxes shown in the portions (A) to (C) of FIG. 6, the direction of the air current F generated within the box 100 when a pressure difference was applied between the inside and outside of the box while blowing the air at a constant wind speed from the front to the back of the drawing surface was obtained.

As a result, in the box 100 shown in the portion (A) of FIG. 6, the air current F was generated in the same direction outward from the upper ventilation port 101 and the lower ventilation port 102.

Meanwhile, in the box 100 shown in the portion (B) of FIG. 6, the air current F flowing inward from the lower ventilation port 102, the air current F flowing outward from the upper ventilation port 101, and the air current F flowing from the lower ventilation port 102 to the upper ventilation port 101 were generated.

Meanwhile, in the box 100 shown in the portion (C) of FIG. 6, the air current F flowing inward from the upper ventilation port 101, the air current F flowing outward from the lower ventilation port 102, and the air current F flowing from the upper ventilation port 101 to the lower ventilation port 102 were generated.

From the above, by making the diameters of the upper ventilation port 101 and the lower ventilation port 102 different and in opposite directions, a difference in pressure loss occurs. In addition, pressure loss causes a difference in the flow velocity (dynamic pressure) of the air current, and the direction of the air current is determined by the resulting dynamic pressure difference. Accordingly, it was confirmed that the flow of the air current F generated in the box 100 could be controlled.

Second Example

In a second example, the flow of the air current F generated within the box 100 shown in the portions (A) and (B) of FIG. 6 above was obtained by simulation when a heat source Q1 with a constant temperature of 100° C. was disposed within the box 100. Further, the heat source Q1 was disposed at a position perpendicular to the partition wall 104.

As a result, in the box 100 shown in the portion (A) of FIG. 6, the air current F flowed outward from the upper ventilation port 101 was generated and a maximum value of a flow velocity thereof was 14.38 cm/s. Meanwhile, the air current F flowed inward from the lower ventilation port 102 was generated and a maximum value of the flow velocity was 13.77 cm/s.

On the other hand, in the box 100 shown in the portion (B) of FIG. 6, the air current F flowed outward from the upper ventilation port 101 was generated and a maximum value of the flow velocity was 17.17 cm/s. Meanwhile, the air current F flowed inward from the lower ventilation port 102 was generated and a maximum value of the flow velocity was 15.30 cm/s.

From the above, it was confirmed that by making the diameters of the upper ventilation port 101 and the lower ventilation port 102 different and in opposite directions, the flow velocity of the air current F generated in the box 100 is improved when the temperature inside the box 100 is increased.

Third Example

In a third example, a temperature change from a room temperature within the box 100 shown in the portions (A) and (B) of FIG. 6 above was obtained by simulation when a heat source Q2 with a constant output of 2 W was disposed within the box 100. Further, the heat source Q2 was disposed at a position parallel to the partition wall 104.

As a result, the temperature in the box 100 shown in the portion (A) of FIG. 6 was increased to 57.27° C. On the other hand, temperature in the box 100 shown in the portion (B) of FIG. 6 was increased to 55.10° C.

From the above, it was confirmed that by making the diameters of the upper ventilation port 101 and the lower ventilation port 102 different and in opposite directions, the circulation (convention) of the air within the box 100 is promoted when the temperature within the box 100 is increased.

In particular, in the box 100 shown in the portion (B) of FIG. 6, the diameter of the upper ventilation port 101 is reduced toward the back surface side, and the diameter of the lower ventilation port 102 was increased toward the back surface side. In the case of the configuration, the air heated inside the box 100 becomes an ascending air current, generating a strong air current F from the lower ventilation port 102 to the upper ventilation port 101, and the flow velocity of the air current F increases. Accordingly, it was confirmed that the heat dissipation effect inside the box 100 was enhanced, and the temperature inside the box 100 was efficiently reduced.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle lamp having a lighting unit disposed inside a lighting body constituted by a housing having an opening in a front surface of the housing and an outer lens configured to cover the opening of the housing, wherein a back part, of the housing, includes a back surface of the housing, such back part includes a plurality of ventilation ports, at least one of the plurality of the ventilation ports (i) is constituted by a ventilation hole that passes through the back part and that includes an opening end on a front surface side, of the back part of the housing, and an opening end on a back surface side, of the back part of the housing, and (ii) includes a first ventilation port which connects an inner space of the lighting body and an outer space of the lighting body, and the first ventilation port has a diameter that changes between the front surface side and the back surface side of the back part of the housing.

2. The vehicle lamp according to claim 1, wherein the first ventilation port has a smaller diameter on the back surface side of the back part of the housing compared to a diameter on the front surface side of the back part of the housing.

3. The vehicle lamp according to claim 2, wherein the plurality of ventilation ports further have a second ventilation port with a diameter on the back surface side larger than a diameter on the front surface side of the back part of the housing.

4. The vehicle lamp according to claim 3, wherein the first ventilation port and the second ventilation port have a tubular duct portion on at least one side of the back surface side and the front surface side of the back part of the housing, and the duct portion has a hole shape having a diameter that changes continuously or stepwise between an opening end on the front surface side and an opening end of the back surface side.

5. The vehicle lamp according to claim 3, wherein the first ventilation port and the second ventilation port are disposed in an upward/downward direction or disposed in a leftward/rightward direction, and the lighting unit is located between the first ventilation port and the second ventilation port.

6. The vehicle lamp according to claim 3, wherein the first ventilation port and the second ventilation port have a tubular duct portion on the back surface side of the back part of the housing, and filters and caps configured to cover the first ventilation port and the second ventilation port are provided on a back surface side of the duct portion of the first ventilation port and a back surface side of the duct portion of the second ventilation port, respectively.

7. A vehicle lamp having a lighting unit disposed inside a lighting body constituted by a housing having an opening in a front surface of the housing and an outer lens configured to cover the opening of the housing, wherein a back part, of the housing, includes a back surface of the housing, such back part includes (i) at least one first ventilation port which connects an inner space of the lighting body and an outer space of the lighting body and (ii) at least one second ventilation port which connects the inner space of the lighting body and the outer space of the lighting body, the first ventilation port has a smaller diameter on a back surface side of the back part of the housing compared to a diameter on a front surface side of the back part of the housing, the second ventilation port has a larger diameter on the back surface side of the back part of the housing compared to a diameter on the front surface side of the back part of the housing, and the first ventilation port is located on an upper side and the second ventilation port is located on a lower side, the second ventilation port lower than the first ventilation port.

8. The vehicle lamp according to claim 7, wherein the lighting unit is disposed between the first ventilation port and the second ventilation port.

9. The vehicle lamp according to claim 7, wherein each of the first ventilation port and the second ventilation port includes a filter configured to cover the first ventilation port and the second ventilation port.

10. The vehicle lamp according to claim 8, wherein the lighting unit is a head lamp.

* * * * *